United States Patent
Osborne et al.

(10) Patent No.: US 11,754,487 B2
(45) Date of Patent: Sep. 12, 2023

(54) FLOW CYTOMETRIC DROPLET DISPENSING SYSTEMS AND METHODS FOR USING THE SAME

(71) Applicant: Becton, Dickinson and Company, Franklin Lakes, NJ (US)

(72) Inventors: Geoffrey W. Osborne, Los Gatos, CA (US); Paul Barclay Purcell, Ouray, CO (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

(21) Appl. No.: 17/326,754

(22) Filed: May 21, 2021

(65) Prior Publication Data
US 2021/0404938 A1 Dec. 30, 2021

Related U.S. Application Data

(60) Provisional application No. 63/114,402, filed on Nov. 16, 2020, provisional application No. 63/043,323, filed on Jun. 24, 2020.

(51) Int. Cl.
*G01N 15/14* (2006.01)

(52) U.S. Cl.
CPC ... *G01N 15/1404* (2013.01); *G01N 2015/149* (2013.01); *G01N 2015/1481* (2013.01)

(58) Field of Classification Search
CPC ....... G01N 15/1404; G01N 2015/1481; G01N 2015/149; G01N 2015/0053; G01N 2015/1006; G01N 15/1459; B01L 3/0241
USPC .......................................................... 209/3
See application file for complete search history.

(56) References Cited

U.S. PATENT DOCUMENTS

| | | | |
|---|---|---|---|
| 6,079,836 A * | 6/2000 | Burr | G01N 15/1404 356/73 |
| 8,748,183 B2 | 6/2014 | Durack et al. | |
| 9,267,873 B2 * | 2/2016 | Kery | G01N 15/1031 |
| 2005/0227362 A1 * | 10/2005 | Lary | G01N 15/1404 436/63 |
| 2009/0107893 A1 * | 4/2009 | Schembri | G01N 15/1459 209/127.1 |
| 2013/0258075 A1 | 10/2013 | Muraki et al. | |
| 2013/0340539 A1 * | 12/2013 | Gaskill-Fox | G01N 15/14 73/864.91 |
| 2014/0051064 A1 * | 2/2014 | van den Engh | G01N 15/14 435/286.1 |
| 2014/0309795 A1 * | 10/2014 | Norton | G01N 15/1404 700/282 |
| 2015/0050638 A1 * | 2/2015 | Marquette | G01N 15/1012 435/286.1 |

(Continued)

FOREIGN PATENT DOCUMENTS

WO WO2012106294 A1 8/2012

*Primary Examiner* — Gene O Crawford
*Assistant Examiner* — Muhammad Awais
(74) *Attorney, Agent, or Firm* — Bret E. Field; BOZICEVIC, FIELD & FRANCIS LLP

(57) ABSTRACT

Flow cytometric droplet dispensing systems and methods for using the same to flow cytometrically dispense droplets into partitions are provided. Aspects of embodiments of the systems include sorting flow cytometers configured to sort both particle-occupied and particle-unoccupied droplets into a partition. Also provided are methods of using the systems. Systems and methods of the invention find use in a variety of applications.

17 Claims, 6 Drawing Sheets

(56) References Cited

U.S. PATENT DOCUMENTS

2020/0158545 A1  5/2020  Norton et al.

* cited by examiner

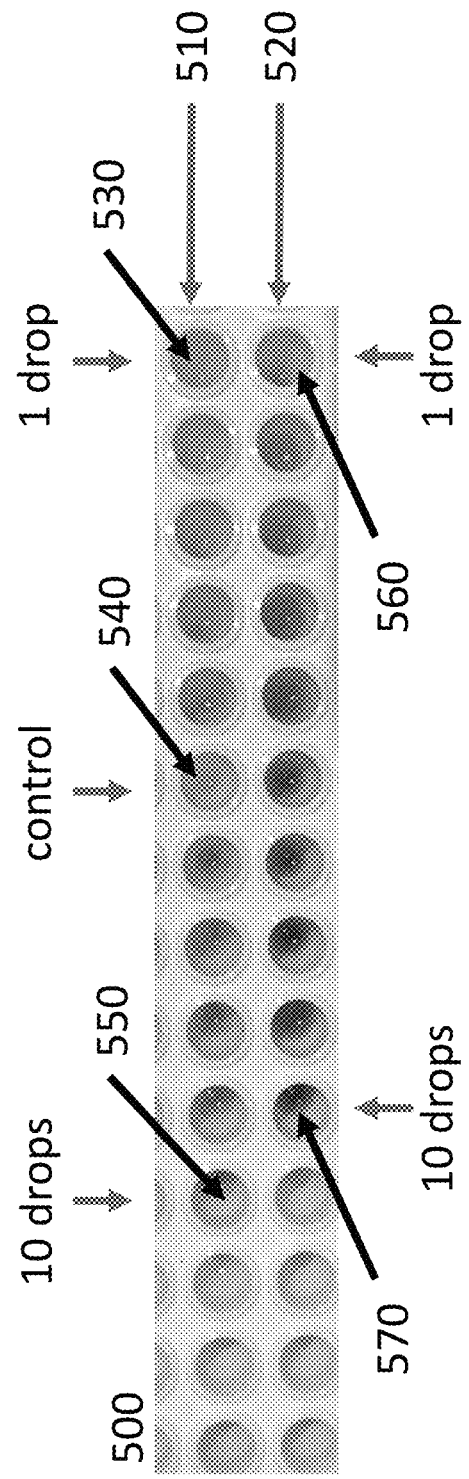

FLOW CYTOMETRIC DROPLET DISPENSING SYSTEMS AND METHODS FOR USING THE SAME

CROSS-REFERENCE TO RELATED APPLICATION

Pursuant to 35 U.S.C. § 119 (e), this application claims priority to the filing dates of U.S. Provisional Patent Application Ser. No. 63/043,323 filed Jun. 24, 2020, and U.S. Provisional Patent Application Ser. No. 63/114,402 filed Nov. 16, 2020, the disclosures of which applications are incorporated herein by reference in their entirety.

INTRODUCTION

Flow-type particle sorting systems, such as sorting flow cytometers, are used to sort particles in a fluid sample based on at least one measured characteristic of the particles. In a flow-type particle sorting system, particles, such as molecules, analyte-bound beads, or individual cells, in a fluid suspension are passed in a stream by a detection region (i.e., interrogation point) in which a sensor detects particles contained in the stream of the type to be sorted. The sensor, upon detecting a particle of the type to be sorted, triggers a sorting mechanism that selectively isolates the particle of interest. Sorted particles of interest are isolated into partitions, such as, for example, sample containers, test tubes or wells of a multi-well plate.

Particle sensing typically is carried out by passing the fluid stream by a detection region in which the particles are exposed to irradiating light, from one or more lasers, and the light scattering and fluorescence properties of the particles are measured. Particles or components thereof can be labeled with fluorescent dyes to facilitate detection, and a multiplicity of different particles or components may be simultaneously detected by using spectrally distinct fluorescent dyes to label the different particles or components. Detection is carried out using one or more photosensors to facilitate the independent measurement of the fluorescence of each distinct fluorescent dye.

To sort particles in the sample, a drop charging mechanism charges droplets of the flow stream that contain a particle type to be sorted with an electrical charge at the break-off point of the flow stream. Droplets are passed through an electrostatic field and are deflected based on polarity and magnitude of charge on the droplet into one or more partitions, such as sample collection containers. Uncharged droplets are not deflected by the electrostatic field.

Traditionally, cell sorting flow cytometers use electrostatic deflection to sort liquid drops containing cells of interest, thereby separating the cells of interest from the rest of the sample. The deflection of a drop, or drops, always relies on a particle triggering the instrument electronics and a subsequent series of classification and deflection decisions based on whether the particle falls inside or outside user defined boundaries, such as whether cell includes a particular surface marker, etc.

SUMMARY

The inventors have discovered that sorting flow cytometers suitably modified, e.g., as described below, may be employed as exceptionally accurate liquid micro-dispensing systems, e.g., with the ability to deflect known volumes of liquid at the nanoliter level of accuracy. Embodiments of the invention include sorting flow cytometers that are configured, e.g., as described below, to sort and deflect droplets without the requirement of a particle triggering the sort decision electronics. Embodiments of flow cytometers of the invention are configured to track both particle-occupied drops (e.g., drops that include wanted or unwanted particles, e.g., cells) and particle-unoccupied drops (e.g., that do not include a cell or bead), where the cytometers are configured to sort known numbers of each type of drop.

Flow cytometric droplet dispensing systems and methods for using the same to flow cytometrically dispense droplets into partitions are provided. Aspects of embodiments of the systems include sorting flow cytometers configured to sort both particle-occupied and particle-unoccupied droplets into a partition. Also provided are methods of using the systems. Systems and methods of the invention find use in a variety of applications.

BRIEF DESCRIPTION OF THE FIGURES

The invention may be best understood from the following detailed description when read in conjunction with the accompanying drawings. Included in the drawings are the following figures:

FIG. 5 depicts results of volumetric dispensing in accordance with an embodiment of the invention as described in the Experimental Section.

DETAILED DESCRIPTION

Figure 1:
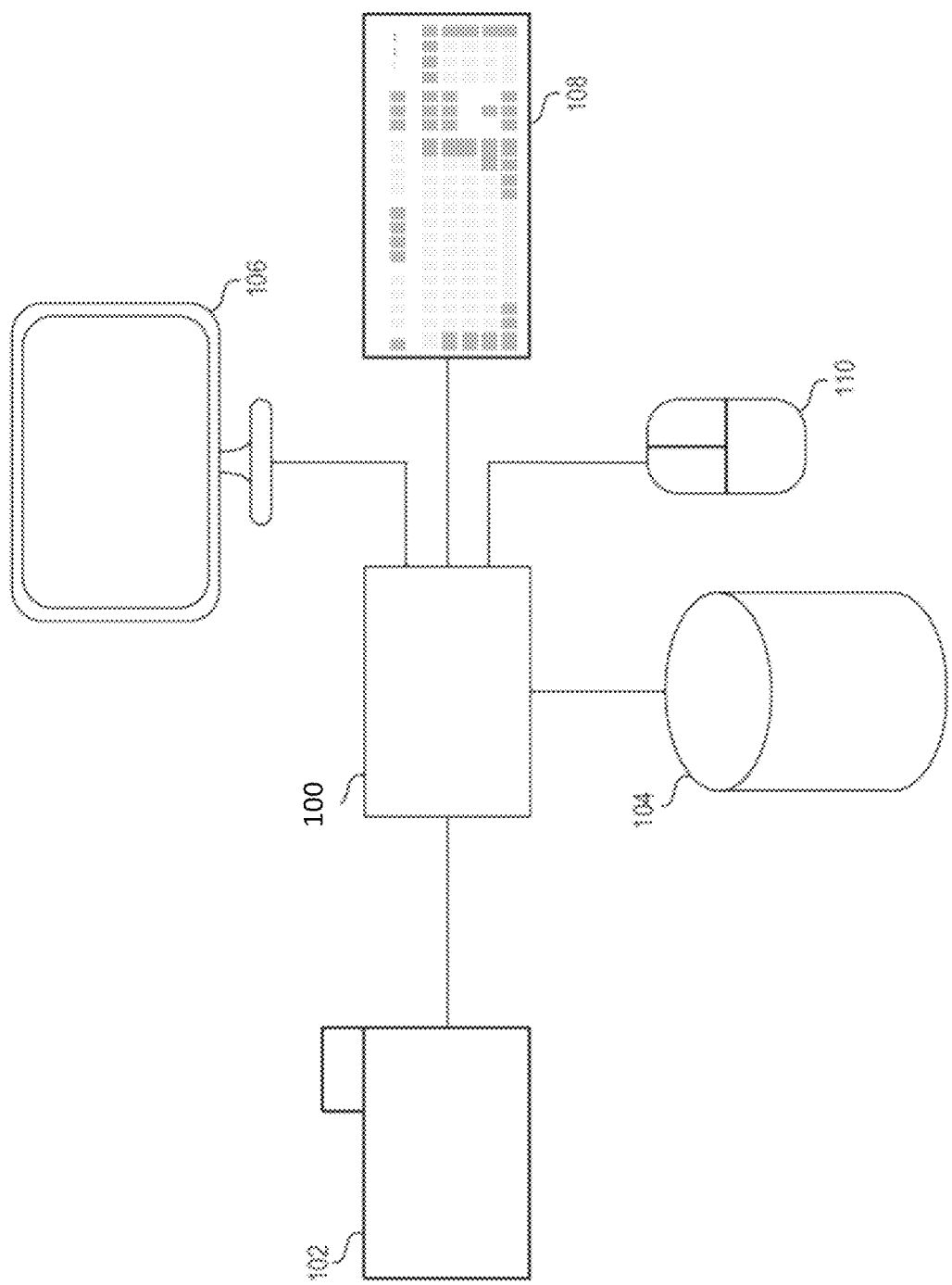
FIG. 1 depicts a functional block diagram for one example of a sorting control system according to certain embodiments.

Flow cytometric droplet dispensing systems and methods for using the same to flow cytometrically dispense droplets into partitions are provided. Aspects of embodiments of the systems include sorting flow cytometers configured to sort both particle-occupied and particle-unoccupied droplets into a partition. Also provided are methods of using the systems. Systems and methods of the invention find use in a variety of applications.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Systems for Flow Cytometrically Dispensing Droplets

As summarized above, aspects of the present disclosure include systems for flow cytometrically dispensing droplets into partitions, where the systems are configured to sort both particle-occupied and particle-unoccupied droplets into a partition. As the systems are configured to sort both particle-occupied and particle-unoccupied droplets into a partition, they are configured to partition-direct both desired particle-occupied and particle-unoccupied droplets. By partition-direct is meant that the systems are configured to dispense desired particle-occupied and particle-unoccupied droplets into a desired or predetermined partition, such that the systems can send or place into a predetermined partition desired particle-occupied droplets and particle-unoccupied droplets. As such, the systems are configured to not require a particle to present in a droplet for that droplet to be sorted into a partition, i.e., for that particle to be partition-directed. As such, systems of the invention are configured to sort or partition-direct desired particle (such as a cell or a bead) occupied droplets and desired unoccupied droplets, i.e., droplets that do not include a particle (such as a cell or a bead) but are nonetheless desired to be sorted, into a partition. Accordingly, aspects of the invention include systems configured to flow cytometrically dispense accurate microvolumes of particle-occupied and unoccupied-droplets into a partition.

By "particle-occupied droplets," it is meant liquid droplets that include at least one particle, where such particles may comprise a cell, a solid support, e.g., bead, a non-cellular particle, etc., where the particle(s) is present in a liquid medium. The number of particles in a given droplet may vary, ranging in some instances from 1 to 5, such as 1 to 3, where, in some instances, particle-occupied droplets include a single particle, e.g., cell or bead. During use, particle-occupied droplets may be desired or not desired. By "desired" particle-occupied droplets, it is meant a droplet that includes at least one particle or type of particle specified in advance, e.g., a specific cell or cell type or bead or bead type, etc. A desired particle may be any particle that satisfies predetermined criteria, e.g., presence or absence of surface markers, light scattering profile, etc. Conversely, undesired particle-occupied droplets are droplets that include a particle, but the particle is not desired because it fails to satisfy predetermined criteria. The liquid component of the particle-occupied droplet may vary, as desired. Liquid components of particle-occupied droplets may be aqueous media that are capable of being charged. The aqueous media may, in some instances, be made up of a sheath fluid and sample fluid, which have been combined upon entering a flow cell to have a sheath of sheath fluid surrounding an inner core of sample fluid. Particles present in particle-occupied droplets may vary, and include cells, solid supports, e.g., polymeric solid supports, such as beads, etc. In general, embodiments may be configured such that particle occupied droplets may contain any particle capable of detection, and in some cases, identification, by the system. For example, the particle may be detected based on detection of light from the interrogation point of the flow cell.

By "particle-unoccupied droplet," it is meant a liquid droplet that does not include a particle. That is, particle-unoccupied droplets include liquid exiting the flow cell, but do not include a particle. As such, as with the particle-occupied droplets, particle-unoccupied droplets may be made up of various aqueous media that are capable of being charged. In some instances, particle-unoccupied droplets may include sheath fluid only. In other instances, particle-unoccupied droplets may include sheath fluid as well as sample fluid, even when no particle of the sample is present. In still other instances, particle-unoccupied droplets may comprise other components, including but not limited to, for example, various reagents, labels, etc., e.g., as described in greater detail below. In these embodiments where particle-unoccupied droplets include other components, the systems may include sources of such components fluidically coupled such that droplets comprising such may be formed. For example, in flow cytometric systems of the invention which include a flow cell that is operably coupled to a sheath fluid conveyor fluidically coupled to a sheath fluid source and a sample fluid conveyor fluidically coupled to a sample fluid source, at least one of the sheath fluid conveyor and sample fluid conveyor may include an access for introducing a composition thereto from the source of the composition. the access may be controllable, e.g., a valve, so that a user may specify when composition is introduced into the conveyor from the source.

In some instances, the droplets have a predetermined (i.e., known) volume. In embodiments, the predetermined droplet volume may be any convenient volume, based on system configuration, including on the nanoliter scale, where in some instances the droplets have a known volume ranging from 0.5 nanoliter to 100 nanoliters, such as 1 nanoliter to 50 nanoliters, e.g., 1 nanoliter to 10 nanoliters. A given system may be configured to produce droplets of only a single, known volume, such the droplet volume may not be adjustable. Alternatively, a given system may be configured to dynamically adjust the predetermined volume of the droplets, such that the known droplet volume is adjustable and may be varied as desired. In some cases, the predetermined volume of droplets may be changed based on how the system is configured, including, for example, by adjusting configurations of the droplet generator, such as an oscillation frequency of the droplet generator, or in other cases by adjusting other system configurations, such as the speed of the flow stream or the diameter of the liquid exiting the flow cell.

Embodiments of the sorting flow cytometric systems of the invention include a droplet sorter configured to partition-direct particle-occupied and particle-unoccupied droplets of a droplet stream produced by a droplet stream generator configured to generate a stream of both particle-occupied droplets and particle-unoccupied droplets from liquid exiting a flow cell, e.g., as described in greater detail below. Such droplet sorters of embodiments of the invention differ from conventional sorting flow cytometers in that they are capable of sorting particle-unoccupied droplets into a desired partition. As such, droplet sorters of the invention do not sort or partition-direct only particle containing droplets, in contrast to conventional sorting flow cytometers.

Droplet sorters of the invention may vary, so long as they may be configured to sort particle-unoccupied droplets in addition to particle-occupied droplets. In some instances, droplet sorters include: a droplet charger configured to charge droplets of the droplet stream, e.g., as described in greater detail below; a droplet deflector configured to deflect charged droplets into a partition, e.g., as described in greater detail below; and a controller configured to control the droplet charger and droplet deflector to partition-direct both particle-occupied and particle-unoccupied droplets. In some instances, the controller comprises a processor and a memory operably coupled thereto, wherein the memory comprises instructions stored thereon, which, when executed by the processor, cause the processor to specify the particle-occupied droplets and particle-unoccupied droplets to be partition-directed by the droplet sorter. The instructions that provide for this functionality may vary, as desired, where examples of such instructions are further described below. In some instances, the system is configured to instruct the droplet sorter to partition each droplet by default.

For example, in some instances a user of the system may want to deposit set volumes of liquid into a given partition. In such instances, the system may be configured such that the default is to sort every drop. In this way, the system may be configured to dispense microvolumes of fluid into partitions based on the number of droplets that are partition directed. In some instances, the system is configured to instruct the droplet deflector to not deflect each droplet by default, but instead only desired particle-occupied droplets, e.g., particle occupied droplets that satisfy predetermined criteria. The system may be configured to be adjustable between these two default states, e.g., in response to instructions input by a user during a particular use of the system. As such, the system may be configured to dynamically instruct the droplet sorter to partition-direct each droplet by default or partition-direct only desired particle-occupied droplets by default.

In some instances, the droplet sorter is configured to partition direct a first predetermined number of particle-occupied droplets and a second predetermined number of particle-unoccupied droplets into the partition. The predetermined number of droplets of a given type, e.g., particle-occupied or particle-unoccupied, may vary, ranging in some instances from 0 to 50, such as 0 to 25, including 0 to 10, or 25 to 50, including 40 to 50. In some instances, the first predetermined number and the second predetermined number are determined so as to achieve a desired ratio between the number of particle-occupied and particle-unoccupied droplets in a given partition. In such instances, the first predetermined number and the second predetermined number may be determined to achieve a desired ratio between the volume of occupied versus unoccupied droplets in the partition with respect to a desired total volume of fluid deflected into the partition. In some cases, occupied droplets include a predetermined volume of sheath fluid and a predetermined volume of sample fluid such that the first predetermined number may be determined so as to deflect a desired total volume of sample fluid and/or sheath fluid into the partition. In some cases, unoccupied droplets are comprised of a predetermined volume of sheath fluid such that the second predetermined number may be determined so as to deflect a desired total volume of sheath fluid into the partition.

In some cases, the system may be configured to deposit a specific total volume of liquid into a partition by deflecting (i.e., partition directing) both particle-occupied and particle-unoccupied droplets into the partition. That is, the volume of each of particle-occupied and particle-unoccupied droplet may be known such that sorting of a specific number of each of particle-occupied and particle-unoccupied droplets to a given partition results in a known total volume of fluid being deposited into that partition. Accordingly, the system may be configured to dispense known microvolumes of fluid including, in some cases, particles of the sample, into a partition. As described, such fluid may include any fluid included in the flow stream, such as, for example, sample liquid, sheath liquid, liquid including other components, e.g., lysing agents, buffering agents, reagents, labels, etc.

The system may further include an input module operably connected to the controller, wherein the input module is configured to receive an input message specifying the desired particle-occupied and particle-unoccupied droplets to sorter. In other words, the input module is configured to receive an input message specifying the particle-occupied and particle-unoccupied droplets to be partition directed. Any convenient input module may be employed. As described in detail below, an input module may comprise, for example, keyboard, mouse or touchscreen device. Input modules may alternatively comprise an operable connection between the sorting controller and another device, such as a network connection, including a wired or wireless connection, such as a Bluetooth connection. By specifying the desired particle-occupied and particle-unoccupied droplets, it is meant, in some cases, specifying via an input module that only desired particle-occupied or, in other cases, only particle-unoccupied droplets are to be directed into a given partition, i.e., partition-directed. In other cases, it is meant specifying via the input module, specific characteristics of the droplets to be partition directed, including, for example, characteristics of a particle in a particle-occupied droplet. In other cases, it is meant specifying via the input module a first predetermined number of particle-occupied droplets and/or a second predetermined number of particle-unoccupied droplets. In other cases, it is meant specifying via the input module a volume of particle-occupied droplets and/or particle-unoccupied droplets, or a ratio thereof, or a total fluid volume, in each case to be deflected into the partition. In still other cases, the input module may be used to specify the amount of a specific type of fluid to be deposited into a partition, such as, for example, a specific volume of a reagent comprising liquid to be directed into a partition. In some embodiments, the system is configured to dynamically adjust the ratio of occupied droplets to unoccupied droplets partition directed over a period of time. In some cases, the system may be configured to adjust the ratio of occupied droplets to unoccupied droplets as between each partition of a group of partitions.

In some instances, the system is configured to record an identifier identifying a particular partition, e.g., well of a multi-well plate, into which a droplet is directed. The identifier may include any convenient information about the partition and/or droplets deposited therein. For example, the system may be configured to record information in the form of an identifier that specifies a specific well of a multi-well plate into which specific particle-occupied and/or particle-unoccupied droplets have been flow cytometrically deposited, such that information is recorded that species the precise liquid that present in a given partition, which is knowable based on knowledge of the specific droplets that have been deposited into that partition. As such, the identifier may include information about the number of particle-occupied and/or particle-unoccupied droplets deflected into the well.

Flow cytometric droplet dispensing systems of embodiments of the invention may be configured for use in specific workflow applications, e.g., as described in greater detail below. For example, a system may be configured for using single cell nucleic acid sequencing library preparation applications. In such instances, systems may be configured to includes sources of various compositions employed in such library preparation applications, e.g., lysing agents, barcoded solids supports (such as barcoded beads), polymerases, nucleotides, oligonucleotides, e.g., primers, TSOs, etc., and the like, as well as ways to prepare droplets that include the same, e.g., access points into sheath and/or sample lines. Alternatively, as system may be configured to contact partitioned cells with a reagent, such as a cell modulating agent, e.g., for use in screening applications, e.g., as described in greater detail below.

FIG. 1 shows a functional block diagram for one example of a sorting control system in accordance with embodiments of the invention. Sorting control system 100 can be configured to control a sorting flow cytometer to partition direct both particle occupied and particle unoccupied droplets, e.g., as described above. In FIG. 1, sorting control system 100 is operably coupled to a sorting flow cytometer 102. A data communication channel can be included between the sorting flow cytometer 102 and the sorting controller 100. Where desired, the sorting controller 100 can be configured to receive biological event data from the sorting flow cytometer 102. The biological event data received from the particle sorting flow cytometer 102 can include flow cytometric event data. The sorting controller 100 can be configured to provide a graphical display of data to a display device 106. The sorting controller 100 can be configured to receive a user input instructions from a first input device. For example, the first input device can be implemented as a mouse 110. The mouse 110 can initiate a droplet sorting selection signal, e.g., sort all droplets or only specific particle-occupied droplets, to the sorting controller 100, as well as input other instructions, e.g., identification of gate to be displayed on or manipulated via the display device 106 (e.g., by clicking on or in the desired gate when the cursor is positioned there). In some implementations, the first device can be implemented as the keyboard 108 or other means for providing an input signal to the sorting controller 100 such as a touchscreen, a stylus, an optical detector, or a voice recognition system. Some input devices can include multiple inputting functions. In such implementations, the inputting functions can each be considered an input device. For example, as shown in FIG. 1, the mouse 110 can include a right mouse button and a left mouse button, each of which can generate a triggering event. The sorting controller 100 can be connected to a storage device 104. The storage device 104 can be configured to receive and store biological event data from the sorting controller 100. The storage device 104 can also be configured to receive and store flow cytometric event data from the sorting controller 100. The storage device 104 can be further configured to allow retrieval of biological event data, such as flow cytometric event data, by the sorting controller 100. A display device 106 can be configured to receive display data from the sorting controller 100. The display device 106 can be further configured to alter the information presented according to input received from the analytics controller 100 in conjunction with input from the sorter 102, the storage device 104, the keyboard 108, and/or the mouse 110. In some implementations the sorting controller 100 can generate a user interface to receive example events for sorting. For example, the user interface can include a control for receiving example events or example images. The example events or images or an example gate can be provided prior to collection of event data for a sample or based on an initial set of events for a portion of the sample.

Figure 2A:
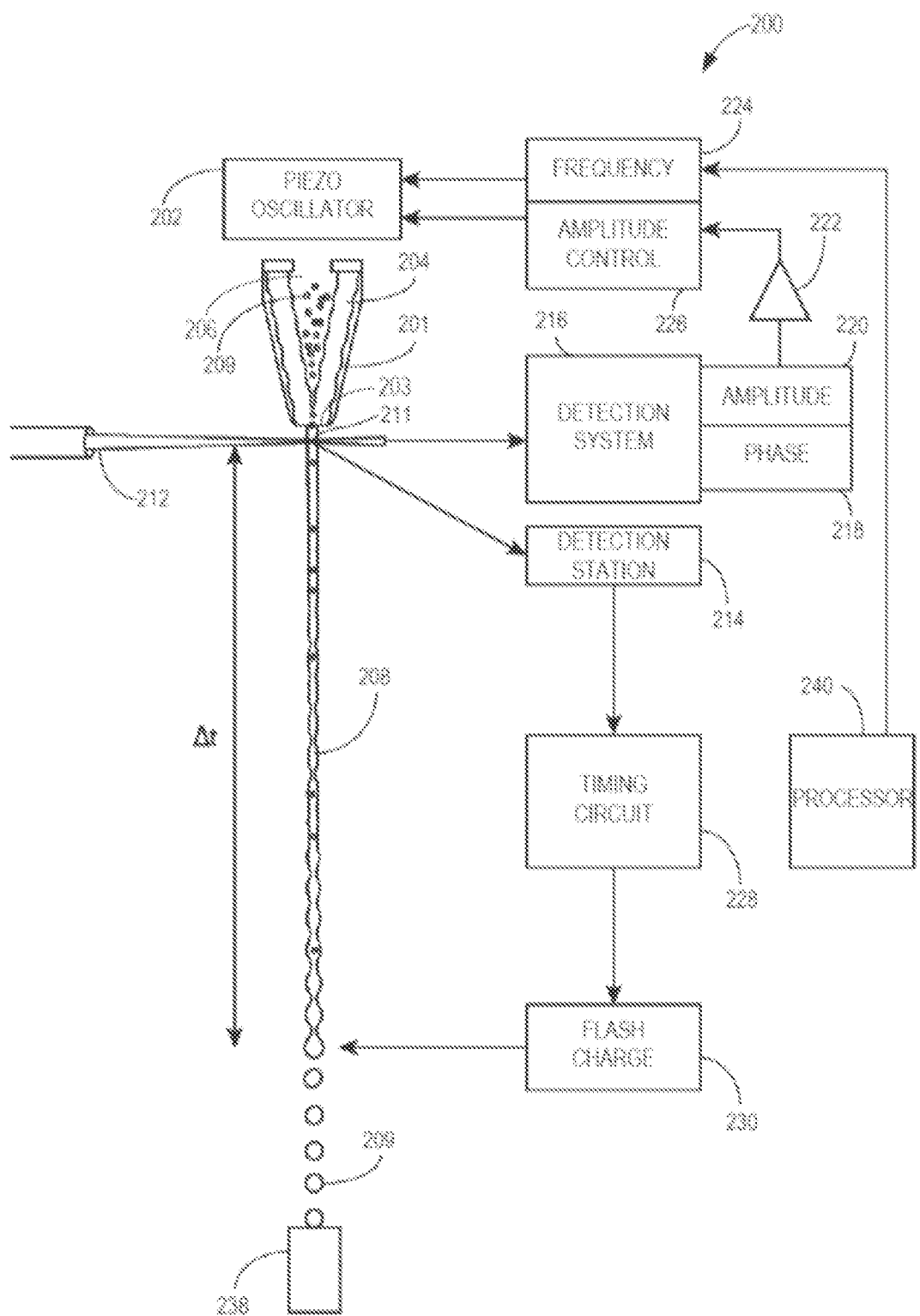
FIG. 2A depicts a schematic drawing of a particle sorter system according to certain embodiments.

FIG. 2A is a schematic drawing of a droplet sorting system 200 of a sorting flow cytometer (e.g., the sorting flow cytometer 102 illustrated in FIG. 1) in accordance with one embodiment presented herein. In some embodiments, the droplet sorting system 200 is a cell sorter system. As shown in FIG. 2A, a drop formation transducer 202 (e.g., piezo-oscillator) is coupled to a fluid conduit 201, which can be coupled to, can include, or can be, a nozzle 203. Within the fluid conduit 201, sheath fluid 204 hydrodynamically focuses a sample fluid 206 comprising particles 209 (e.g., cells or solid supports, such as polymeric beads) into a moving fluid column 208 (e.g., a stream). Within the moving fluid column 208, particles 209 (e.g., cells or solid supports, such as polymeric beads) are lined up in single file to cross a monitored area 211 (e.g., where laser-stream intersect), irradiated by an irradiation source 212 (e.g., a laser). Vibration of the drop formation transducer 202 causes moving fluid column 208 to break into a plurality of drops 210, some of which contain particles 209 and are therefore particle-occupied droplets and some of which do not contain particles, e.g., are liquid only, and are therefore particle-unoccupied droplets.

In operation, a detection station 214 (e.g., an event detector) identifies when a particle of interest (or cell of interest) crosses the monitored area 211. Detection station 214 feeds into a timing circuit 228, which in turn feeds into a flash charge circuit 230. At a drop break off point, informed by a timed drop delay (at), a flash charge can be applied to the moving fluid column 208 such that a drop of interest carries a charge. The drop of interest can include one or more particles or cells to be sorted. The charged drop can then be sorted by activating deflection plates (not shown) to deflect the drop into partitions, for example, a vessel such as a collection tube or a multi-well or microwell sample plate where a partition or a well or a microwell can be associated with drops of particular interest. As shown in FIG. 2A, the drops can also be collected in a drain receptacle 238.

A detection system 216 (e.g., a drop boundary detector) serves to automatically determine the phase of a drop drive signal when a particle of interest passes the monitored area 211. An exemplary drop boundary detector is described in U.S. Pat. No. 7,679,039, which is incorporated herein by reference in its entirety. The detection system 216 allows the instrument to accurately calculate the place of each detected particle in a drop. The detection system 216 can feed into an amplitude signal 220 and/or phase 218 signal, which in turn feeds (via amplifier 222) into an amplitude control circuit 226 and/or frequency control circuit 224. The amplitude control circuit 226 and/or frequency control circuit 224, in turn, controls the drop formation transducer 202. The amplitude control circuit 226 and/or frequency control circuit 224 can be included in a control system.

In some implementations, sort electronics (e.g., the detection system 216, the detection station 214 and a processor 240) can be coupled with a memory configured to store the detected events and a sort decision based thereon. The sort decision can be included in the event data for a particle. In some implementations, the detection system 216 and the detection station 214 can be implemented as a single detection unit or communicatively coupled such that an event measurement can be collected by one of the detection system 216 or the detection station 214 and provided to the non-collecting element.

As discussed above, the sorting system is configured to partition direct both selected particle-occupied droplets and a particle-unoccupied droplets according to a predetermined instruction. The sorting system can be configured to implement this functionality using any convenient protocol. An example of such a protocol is now provided. The decision to charge the stream is made in the droplet time domain. The droplet time domain is determined by drop drive electronics that perturb the stream at a known frequency so that it breaks off into droplets. The charge electronics places a charge on the stream with knowledge of the drop drive frequency so that a specific droplet carries a charge and is deflected when it passes through an electromagnetic field, e.g., as provide by deflection plates. In some instances, where the decision is to sort only desired particle-occupied droplets, e.g., those that satisfy predetermined criteria, the droplet time domain is predetermined to not sort. Where the decision is to sort empty droplets, the droplet time domain is predetermined to sort each droplet. Particles intercepting a laser represent an event time domain. To deflect a particle, the event time domain from which the target particle is detected is correlated with the droplet time domain so that the charging electronics charges the droplet containing the target particle. Where empty (particle-unoccupied) droplet sorting is desired, all particles in the event time are correlated to the droplet time domain and negate the predetermined sort decision unless a particle itself is to be sorted.

Figure 2B:
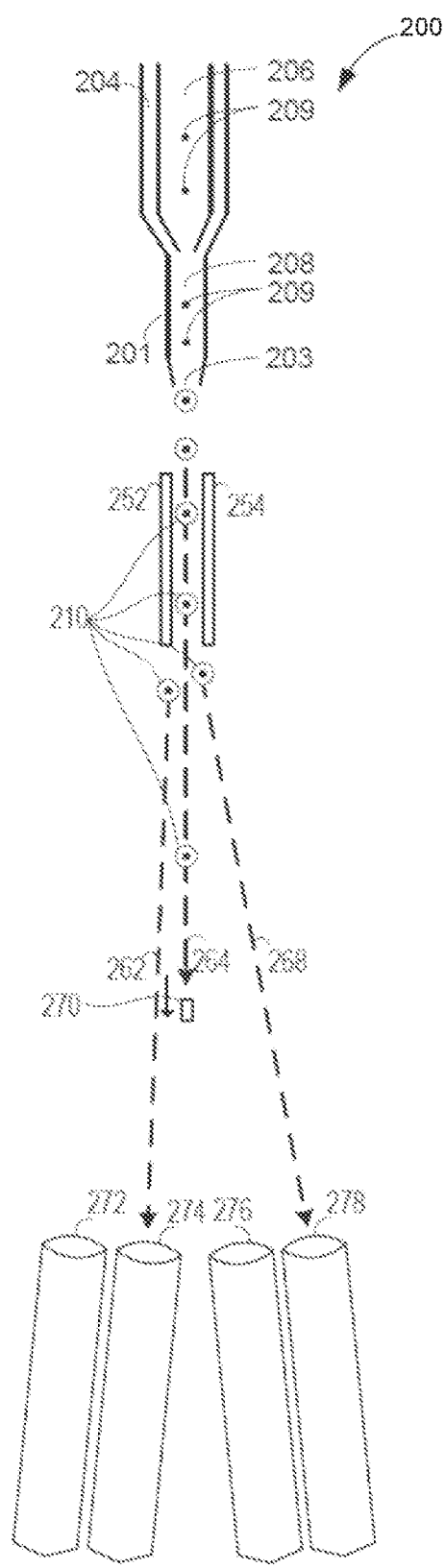
FIG. 2B depicts a schematic drawing of a particle sorter system according to certain embodiments.

FIG. 2B is a schematic drawing of a droplet sorting system 200, in accordance with one embodiment presented herein. The droplet sorting system 200 shown in FIG. 2B includes deflection plates 252 and 254. A charge can be applied via a stream-charging wire in a barb. This creates a stream of droplets 210 containing particles as well as particle-unoccupied droplets. The particles can be illuminated with one or more light sources (e.g., lasers) to generate light scatter and fluorescence information. The information for a particle is analyzed such as by sorting electronics or other detection system (not shown in FIG. 2B). The deflection plates 252 and 254 can be independently controlled to attract or repel the charged droplet to guide the droplet toward a destination collection receptacle (e.g., one of 272, 274, 276, or 278), such as a partition. As shown in FIG. 2B, the deflection plates 252 and 254 can be controlled to direct a droplet along a first path 262 toward the receptacle 274 or along a second path 268 toward the receptacle 278. If the particle is not of interest (e.g., does not exhibit scatter or illumination information within a specified sort range), deflection plates may allow the particle to continue along a flow path 264. Such uncharged droplets may pass into a waste receptacle such as via aspirator 270. The sorting electronics can be included to initiate collection of measurements, receive fluorescence signals for particles, and determine how to adjust the deflection plates to cause sorting of the particles. Example implementations of the embodiment shown in FIG. 2B include the BD FACSAria™ line of flow cytometers commercially provided by Becton, Dickinson and Company (Franklin Lakes, N.J.).

Figure 3:
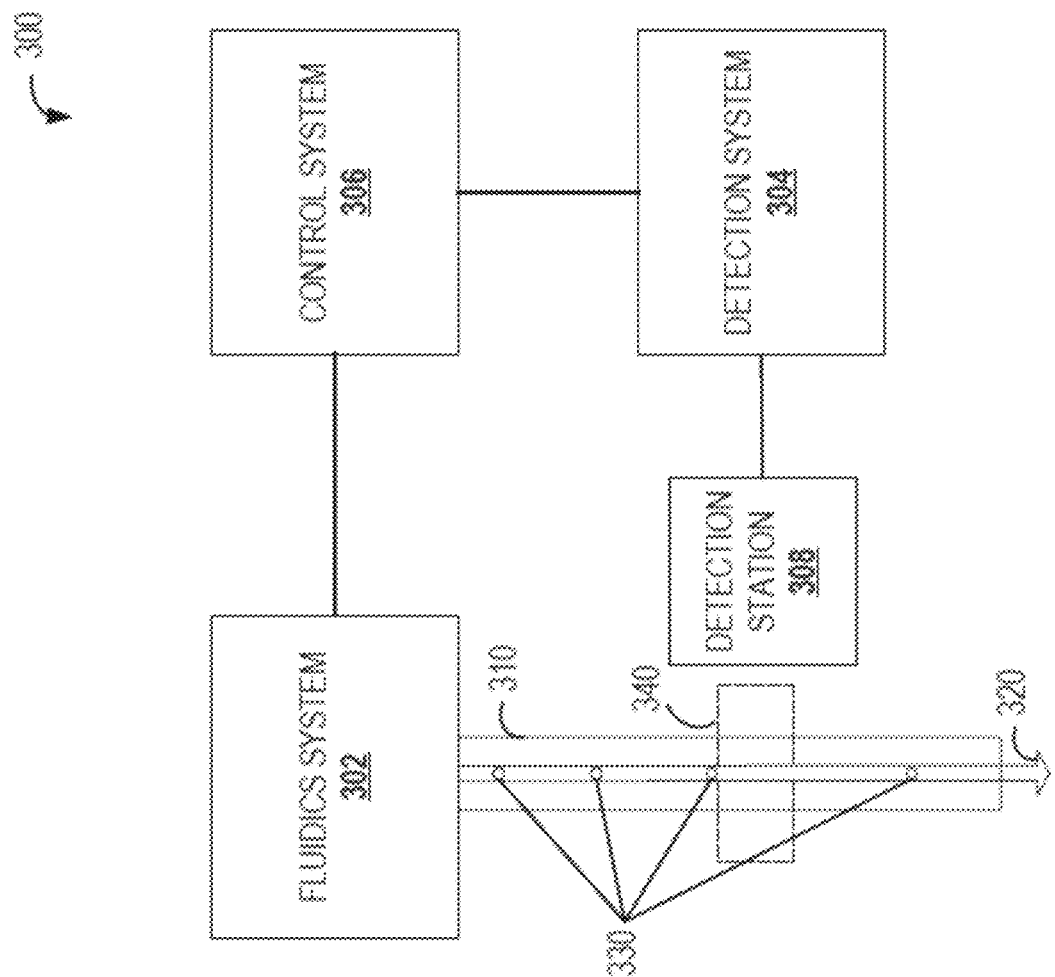
FIG. 3 depicts a functional block diagram of a particle analysis system for computational based sample analysis and particle characterization according to certain embodiments.

FIG. 3 shows a functional block diagram of sorting flow cytometer system for flow cytometrically dispensing droplets into partitions in accordance with the invention. The sorting flow cytometer system 300 shown in FIG. 3 can be configured to perform, in whole or in part, the methods described herein. The sorting flow cytometer system 300 includes a fluidics system 302. The fluidics system 302 can include or be coupled with a sample tube 310 and a moving fluid column within the sample tube in which particles 330 (e.g., cells, beads) of a sample move along a common sample path 320. In certain embodiments, the fluidics system may comprise a source of sample, sample fluid, lysis agent, a source of sheath fluid, source of one or more reagents, source of solid supports, e.g., beads, etc. (in each case, not shown in the figure).

The sorting flow cytometer system 300 includes a detection system 304 configured to collect a signal from each particle as it passes one or more detection stations along the common sample path. A detection station 308 generally refers to a monitored area 340 of the common sample path. Detection can, in some implementations, include detecting light or one or more other properties of the particles 330 as they pass through a monitored area 340. In FIG. 3, one detection station 308 with one monitored area 340 is shown. Some implementations of the particle analysis system 300 can include multiple detection stations. Furthermore, some detection stations can monitor more than one area. Each signal is assigned a signal value to form a data point for each particle. This data can be referred to as event data. The data point can be a multidimensional data point including values for respective properties measured for a particle. The detection system 304 may be configured to collect a succession of such data points in a first time interval.

Figure 4:
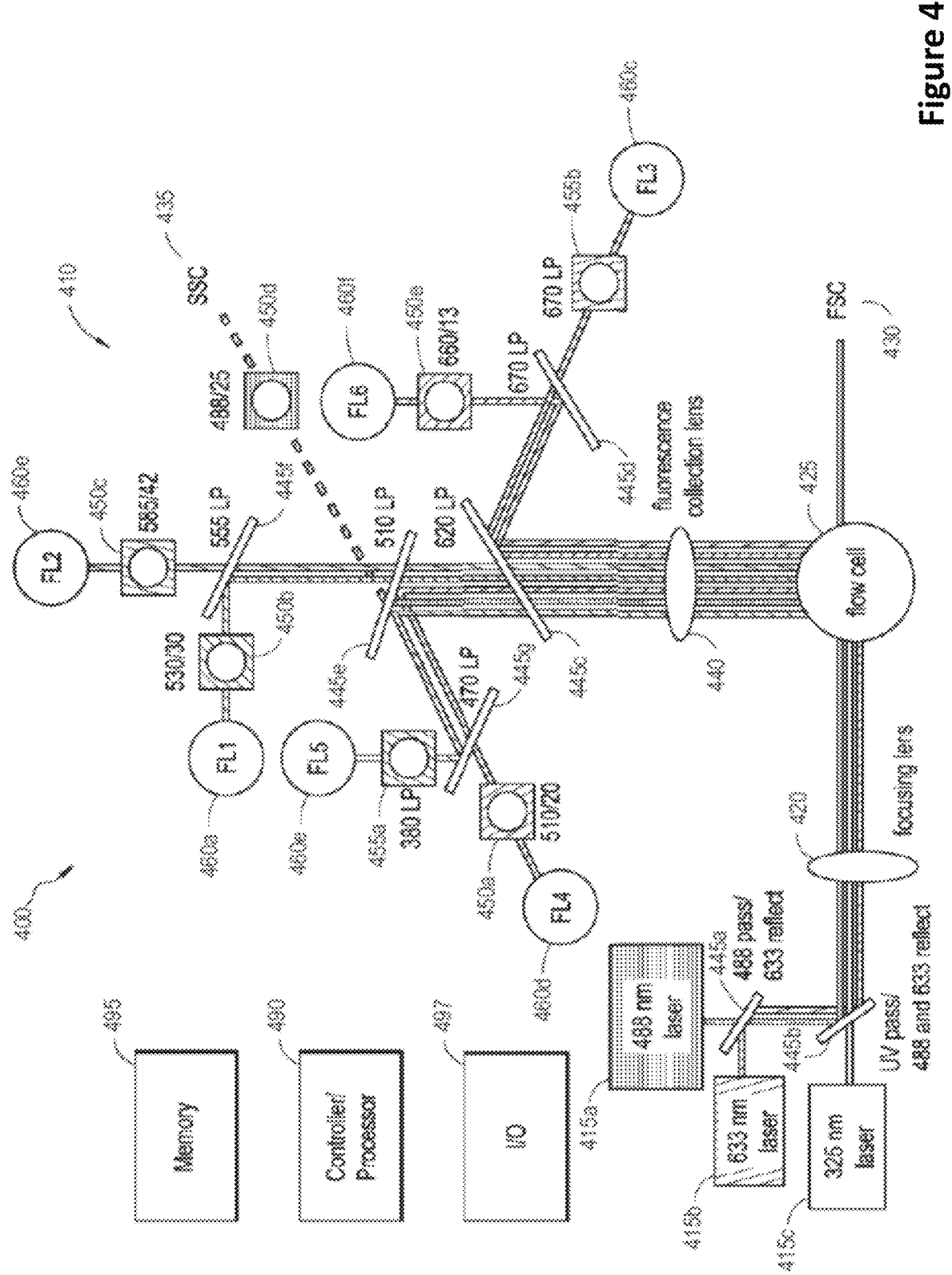
FIG. 4 depicts a flow cytometer according to certain embodiments.

The sorting flow cytometer system 300 can also include a control system 306. The control system 306 can include one or more processors, an amplitude control circuit 226 and/or a frequency control circuit 224, e.g., as shown in FIG. 2A. The control system 306 shown can be operationally associated with the fluidics system 302. The control system 306 can be configured to generate a calculated signal frequency for at least a portion of a first time interval based on a Poisson distribution and the number of data points collected by the detection system 304 during the first time interval. The control system 306 can be further configured to generate an experimental signal frequency based on the number of data points in the portion of the first time interval. The control system 306 can additionally compare the experimental signal frequency with that of a calculated signal frequency or a predetermined signal frequency. The control system can control a of the system to partition direct particle-occupied and particle-unoccupied droplets FIG. 4 shows a particle analysis system 400 for sorting flow cytometer in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 415a-c emit light in the form of a laser beam. The wavelengths of the laser beams emitted from excitation lasers 415a-415c are 488 nm, 633 nm, and 325 nm, respectively, in the example system of FIG. 4. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4 includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Flow Cytometric Systems

Additional aspects of flow cytometer systems according to embodiments of the invention are described in Ormerod (ed.), *Flow Cytometry: A Practical Approach*, Oxford Univ. Press (1997); Jaroszeski et al. (eds.), Flow Cytometry Protocols, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5):502-11; Alison, et al. J Pathol, 2010 December; 222(4):335-344; and Herbig, et al. (2007) *Crit Rev Ther Drug Carrier Syst*. 24(3):203-255; the disclosures of which are incorporated herein by reference. Flow cytometry systems of interest that having components found in flow cytometers of embodiments of the present invention include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In certain instances, the subject particle sorters are flow cytometry systems configured for imaging particles in a flow stream by fluorescence imaging using radiofrequency tagged emission (FIRE), (e.g., by employing light beam generators configured to generate two or more beams of frequency shifted light include laser excitation modules) such as those described in Diebold, et al. *Nature Photonics* Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

As mentioned above, in embodiments of the invention, systems of the invention include a plurality of partitions configured to receive droplets, e.g., droplets with cells from the sample or unoccupied droplets, sorted by the droplet sorter. By partition, it is meant any convenient container, such as a sample collection container, capable of receiving one or more droplets, e.g., unoccupied droplets or droplets with particles, such as a cell, sorted by the cell sorter and maintaining the contents of the partition separate and isolated from other materials not sorted into the partition. Embodiments include more than one partition, such as two partitions, four partitions, 96 partitions or 1536 or more partitions. Partitions may be any convenient size that is capable of receiving and maintaining particles, such as cells, isolated from the sample of the flow stream. In some cases, partitions are sized to hold more than one droplet, such as 10 droplets, 100 droplets, 1000 droplets, 10,000 droplets or more. In other cases, partitions are sized to hold more than one cell, such as 10 cells, 100 cells, 1,000 cells, 10,000 cells or more. In some embodiments, partitions comprise wells. In instances, wells may be small test tubes. Wells may be any convenient shape. In some instances, the shape of the lateral cross section of wells is circular; in other cases, it is rectangular or square. Wells may be any size with sufficient capacity for holding droplets, such as unoccupied droplets or droplets with particles, such as cells, as needed. For example, the volume of a well may be 0.001 mL or greater, such as 0.005 mL or 0.015 mL or 0.1 mL or 2 mL or 5 mL or greater. In some embodiments, wells may be wells of a multi-well plate. A multi-well plate may include any number of wells. In instances, a multi-well plate may include six or 12 or 24 or 48 or 96 or 384 or 1536 or 3456 or 9600 or more wells. Wells of a multi-well plate may be arranged in any convenient pattern. In some instances, wells are arranged in a rectangular shape with a length to width ratio of approximately two to three. In some instances, multi-well plates of the present disclosure may conform to accepted standards such as a standard established by the Society for Biomolecular Sciences with the ANSI-Standards. Multi-well plates may be composed of any convenient material. In some cases, multi-well plates may be composed of polypropylene, polystyrene or polycarbonate. In these embodiments, the multi-well plate may be advanced to a second well after sorting a predetermined number of particle occupied or unoccupied droplets into a first well. The predetermined number of droplets may be one droplet, two droplets, ten droplets or 100 droplets or more.

In some embodiments, the system further comprises a translatable support stage configured to move the plurality of partitions, e.g., a multi-well plate, and the processor comprises memory operably coupled to the processor, wherein the memory comprises instructions stored thereon, which, when executed by the processor, cause the processor to instruct the support stage to move the multi-well plate to a second well after sorting a predetermined number of particle occupied or unoccupied droplets into a first well. By translatable support stage, it is meant any convenient stage capable of receiving a plurality of partitions, e.g., a multi-well plate. Any convenient displacement protocol may be employed to translate the support stage, such as moving the support stage with a motor actuated translation stage, lead-screw translation assembly, geared translation device, such as those employing a stepper motor, servo motor, brushless electric motor, brushed DC motor, micro-step drive motor, high resolution stepper motor, among other types of motors.

As reviewed above, systems according to some embodiments, may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system, and the operating system interfaces with firmware and hardware in a well-known manner and facilitates the processor in coordinating and executing the functions of various computer programs that may be written in a variety of programming languages, such as Java, Perl, C++, other high level or low-level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, the processor includes analog electronics which provide feedback control, such as for example negative feedback control.

The system memory may be any of a variety of known or future memory storage devices. Examples include any commonly available random-access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor of the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to the processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via a system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located, or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Oracle Solaris, Linux, OS/400, Compaq Tru64 Unix, SGI IRIX, Siemens Reliant Unix, Ubuntu, Zorin OS and others.

Methods for Flow Cytometrically Dispensing Droplets into Partitions

Embodiments of the invention also include methods for flow cytometrically dispensing droplets into partitions, e.g., with systems such as described above. Aspects of the methods include flow cytometrically sorting particle-occupied and particle-unoccupied droplets into a partition, e.g., as described above. As such, aspects of the methods include partition directing particle-unoccupied droplets, in addition to conventional particle sorting. Accordingly, methods of invention include flow cytometric protocols, including sorting flow cytometric protocols, employed with convention flow cytometers (e.g., in accordance with known workflows), which are modified to include deposition of particle-unoccupied droplets into a partition(s).

For example, in applications where cells are partition sorted into wells of a multi-well plate, methods of the invention may further include directing particle-unoccupied droplets into wells of the multi-well plate to add additional sheath liquid to those wells, e.g., to prevent evaporation and resultant damage to cells present in the wells. In such applications, the particle-unoccupied droplets may include sheath fluid or some other liquid, e.g., buffer, etc., as desired. The number of particle-unoccupied droplets that are partition directed to wells may vary as desired, e.g., to achieve a desired total volume of liquid in the wells.

Embodiments of the methods further include applications where sorted cells are contacted with reagents, such as cellular modulating agents, e.g., to determine the activity of such reagents with respect to sorted cells. For example, methods of invention may include sorting cells into wells of a multi well plate, followed by partition directing particle-unoccupied droplets that include a reagent into those wells, e.g., to determine the activity of the reagent on the cell. In such screening applications, a collection of two or more partitions containing the same type of sorted cell (i.e., cells that are identical based on predetermined sorting criteria) may be contacted with different concentrations of the reagent that is being screened, e.g., by partition different numbers of reagent containing particle-unoccupied droplets to the different wells. In this manner, where desired, a reagent gradient may be set up among multiple cell containing partitions, e.g., to determine the impact of different concentrations of the reagent on the cell. In such, applications, the reagent which is introduced into partitions via particle-unoccupied droplets may vary, wherein in some instances the reagent is a cellular modulating agent (or at least an agent suspected of having cellular modulating activity), where examples of such agents include, but are not limited to: peptides, proteins, nucleic acids, small molecules, and the like. Instead of or in addition to such reagents, methods may include introducing a label or member of a signal producing system into a partition via a particle-unoccupied droplet, e.g., in an analogous manner. Examples of labels include fluorescent labels, nucleic acid labels, etc. Examples of signal producing systems include enzymes, e.g., which convert a substrate to a detectable product, etc. Any desired label, signal producing system or component thereof, etc., may be introduced into a partition via a particle-unoccupied droplet in accordance with embodiments of the invention.

In some embodiments, the systems are configured for use in single cell sequencing workflows, such as sequence library preparation or portions thereof. For example, systems in such embodiments may include a source of lysis agent and a source of oligonucleotide barcoded solid supports, such as oligonucleotide barcoded beads (where the oligonucleotide barcode may include a cell label and a unique molecular index, among other functional domains) for combining with a cell in a partition to prepare a sequencing ready library from the cell. Any convenient lysis agent may be present in systems of the invention, such as any lysis agent capable of causing chemical lysis of relevant cells and inclusion in the flow stream, including, for example, enzymes or detergents or the like. In embodiments of such systems, the system is configured to direct into a partition an occupied droplet comprising a cell. The partition may include a barcoded solid support, e.g., barcoded bead, which may be magnetic. Alternatively, the system may be configured to also direct into partitions an occupied droplet comprising an oligonucleotide barcoded solid support, e.g., bead, such as a magnetic bead. The system is further configured to direct into partitions a sufficient amount of lysis agent (e.g., in an unoccupied droplet(s)). As such, systems in such embodiments may further comprise a source of oligonucleotide barcoded solid supports, such as a barcode oligonucleotide comprising a cell label or oligonucleotide barcoded beads. In some instances, the barcode oligonucleotide further comprises a unique molecular index. In some embodiments, oligonucleotide barcoded solid supports may be configured for use in identifying aspects of a cell deflected into the same partition as an oligonucleotide barcoded solid support. In some embodiments, the system may further include one or more additional components employed in single cell sequence library preparation, e.g., nucleotides, polymerases, oligonucleotides, such as primers or TSOs, etc. In some instances, the system further comprises a processor comprising memory operably coupled to the processor, wherein the memory comprises instructions stored thereon, which, when executed by the processor, cause the processor to record an identifier identifying the partition into which the cell and the oligonucleotide barcoded solid support are deflected. That is, the system may be configured to establish a record of which partition each cell and oligonucleotide barcoded solid support is deflected into. Further details regarding nucleic acid library preparation with barcoded beads and compositions used therein are provided in International Patent Application Serial No. PCT/US2020/060692 filed Nov. 16, 2020, the disclosure of which is herein incorporated by reference.

In some instances, the system is configured to dispense one or more reagents, e.g., in unoccupied droplets, into a partition. For example, systems of the invention may include a source of sheath fluid. Systems may further include a source of a first reagent. The first reagent may vary. In some instances, the first reagent is a cellular modulating agent, where examples of cellular modulating agents vary and include, but are not limited to: peptides or proteins, nucleic acids; small molecules, etc. In some instances, the first reagent may include a label or member of a signal producing system. In some instances, the system further comprises a source of a second reagent. The first reagent may vary, and, in some instances, the second reagent may be any of the reagents described above with respect to the first reagent. In some instances, the system is configured to provide a dynamically configurable amount of the first reagent, and optionally second reagent, in the sheath fluid and/or sample. By dynamically configurable amount of reagent, it is meant that, in some instances, the system may be configured to dynamically adjust the volume or concentration of reagent introduced in the flow stream. For example, in embodiments, the system may be configured to dynamically adjust the volume or concentration of reagent introduced into the sheath fluid. In other embodiments, the system may be configured to dynamically adjust the volume or concentration of reagent introduced into the sample, for example via the sample fluid. Ultimately, embodiments of systems of the present invention may be configured to dynamically adjust the volume or concentration of reagent deflected into a partition, e.g., by dynamically adjusting the amount of reagent introduced into the flow stream, e.g., via sheath fluid or sample (e.g., via the sample fluid).

Computer-Readable Storage Medium

Aspects of the present disclosure further include non-transitory computer readable storage media having stored thereon instructions for operating a flow cytometer in accordance with embodiments of the invention to be able to sort both particle-occupied and particle-unoccupied droplets. In some embodiments, computer readable storage media of interest comprise a computer program stored thereon, where the computer program when loaded on the computer, comprises instructions having an algorithm for directing a droplet sorter to partition direct desired particle-occupied and particle-unoccupied droplets, e.g., as described above. Computer readable storage mediums may be employed on one or more computers for complete automation or partial automation of a system for practicing methods described herein. In certain embodiments, instructions in accordance with the method described herein can be coded onto a computer-readable medium in the form of "programming," where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on a computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, Calif.), Visual Basic (Microsoft Corp., Redmond, Wash.), and C++ (AT&T Corp., Bedminster, N.J.), as well as any many others.

The computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

The following example is offered by way of illustration and not by way of limitation.

EXPERIMENTAL

FIG. 5 provides details of an implementation of the invention. Seen in FIG. 5 is a section of a multi-well plate 500 with first row 510 and second row 520. FIG. 5 provides an example of colorimetric gradient generated by additional droplets containing media. Sample media contains beads and horse radish peroxidase (HRP). Wells contain TMB only. The multi-well plate 500 seen in FIG. 5 is depicted after the system according to the present invention was used to deflect specific numbers of droplets into wells of the multi-well plate 500. Initially, the wells in the multi-well plate included TMB (3,3', 5,5"-tetramethylbenzidine) substrate solution only. For purposes of illustrating the effect of the system, the sample media used by the system comprised beads as well as horse radish peroxidase (HRP) (though other fluids may be included in the system). When the droplets comprising beads and HRP are combined with the TMB already present in the wells, the color of the solution in the well changes accordingly. The more droplets comprising beads and HRP that are deposited in a well, the more dramatically the color of the solution in the well changes. For example, a well with one droplet with beads and HRP will appear more clear and less opaque than a well with ten droplets of beads and HRP. The system was used to deflect a single droplet with beads and HRP into well 530 and to increase the number of droplets with beads and HRP by one in each contiguous well moving to the left of well 530, with ten droplets being deposited in well 550, with the exception of well 540. Well 540 is a control case, in which no droplets were deflected and therefore no beads and HRP were added to this well. FIG. 5 depicts that the solution in each well moving to the left from 530 to 550 becomes less clear and more opaque, with the intended exception of control well 540, which remains completely clear. Similarly, in row 520, the system was used to deflect a single droplet comprising beads and HRP into well 560, with an additional droplet deflected into each contiguous well moving to the left from well 560, such that ten droplets were deflected into well 570. Like row 510, row 520 shows the solution in each well becoming incrementally less clear and more opaque, moving from right to left from well 560 to well 570.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112(f) or 35 U.S.C. § 112(6) is not invoked.

What is claimed is:

1. A system for flow cytometrically dispensing droplets into partitions, the system comprising:
   a droplet sorting system comprising:
      a flow cell configured to flow a stream of particle containing liquid past an interrogation point;
      a light source for irradiating the interrogation point;
      a detector configured to detect an interaction between irradiating light and a particle in the flow stream;
      a droplet stream generator configured to generate a stream of both particle-occupied droplets and particle-unoccupied droplets from liquid exiting the flow cell; and
      a droplet sorter configured to partition-direct particle-occupied and particle-unoccupied droplets, wherein the droplet sorter comprises:
         a droplet charger configured to charge droplets of the droplet stream;
         a droplet deflector configured to deflect charged droplets into a partition; and
         a controller configured to determine if each droplet of the droplet stream is particle-occupied or particle-unoccupied based on data from the detector and control the droplet charger and droplet deflector to partition direct particle-occupied and particle-unoccupied droplets based on the determination.

2. The system according to claim 1, wherein the controller is configured to partition direct a first predetermined number of particle-occupied droplets and a second predetermined number of particle-unoccupied droplets.

3. The system according to claim 1, further comprising an input module operably connected to the droplet sorter, wherein the input module is configured to receive an input message specifying the particle-occupied and particle-unoccupied droplets to be partition directed.

4. The system according to claim 1, wherein the system is configured to dynamically adjust the ratio of particle-occupied droplets to particle-unoccupied droplets that are partition-directed over a period of time.

5. The system according to claim 1, wherein the system is configured to dynamically instruct the droplet sorter to partition-direct each droplet by default or partition-direct only desired particle-occupied droplets by default.

6. The system according to claim 1, wherein the droplets have a predetermined volume.

7. The system according to claim 6, wherein the droplet generator is configured to dynamically adjust the predetermined volume of the droplets.

8. The system according to claim 1, wherein the droplet sorter is configured to partition-direct particle-occupied and particle-unoccupied droplets into a well of a multi-well plate.

9. The system according to claim 8, wherein the system is configured to record an identifier identifying the well of the multi-well plate into which a droplet is directed.

10. The system according to claim 9, wherein the identifier identifies the number of particle-occupied and/or particle-unoccupied droplets deflected into the well.

11. The system according to claim 1, wherein the system comprises a cellular sample source, a barcoded solid support source and a cell lysis agent source.

12. The system according to claim 11, wherein the system is configured to direct a first particle-occupied droplet comprising a cell, a second particle-occupied droplet comprising a barcoded solid support and a first particle-unoccupied droplet comprising a lysis agent into the same partition.

13. The system according to claim 12, wherein the system is further configured to record an identifier identifying the partition into which the particle-occupied droplet comprising the cell, the particle-occupied droplet comprising the barcoded solid support and the particle-unoccupied droplet comprising the lysis agent are directed.

14. A method for flow cytometrically dispensing droplets into partitions, the method comprising:
flowing a stream of a particle containing liquid past an interrogation point of a flow cell;
irradiating the interrogation point with light;
detecting light with a detector configured to detect an interaction between irradiating light and a particle in the flow stream;
producing from liquid exiting the flow cell a droplet stream comprising particle-occupied droplets and particle-unoccupied droplets; and
partition directing droplets of the droplet stream with a droplet sorter configured to partition-direct particle-occupied and particle-unoccupied droplets, wherein the droplet sorter comprises:
a droplet charger configured to charge droplets of the droplet stream;
a droplet deflector configured to deflect charged droplets into a partition; and
a controller configured to determine if each droplet of the droplet stream is particle-occupied or particle-unoccupied based on data from the detector and control the droplet charger and droplet deflector to partition direct particle-occupied and particle-unoccupied droplets based on the determination.

15. The method according to claim 14, wherein the controller is configured to partition direct a first predetermined number of particle-occupied droplets and a second predetermined number of particle-unoccupied droplets.

16. The method according to claim 14, wherein the controller comprises a processor and a memory operably coupled thereto, wherein the memory comprises instructions stored thereon, which, when executed by the processor, cause the processor to specify to the droplet sorter the particle-occupied droplets and particle-unoccupied droplets to be partition directed.

17. The method according to claim 14, wherein the method further comprises inputting into an input module operably connected to the droplet sorter an input message specifying the particle-occupied and particle-unoccupied droplets to be partition directed.

* * * * *